United States Patent

[11] 3,619,770

| [72] | Inventor | Friedrich M. O. Forster<br>Der Schoene Weg 144, 7410 Reutlingen, Germany |
|---|---|---|
| [21] | Appl. No. | 15,524 |
| [22] | Filed | Mar. 2, 1970 |
| [45] | Patented | Nov. 9, 1971 |

[54] EDDY CURRENT TEST SYSTEM FOR INDICATING THE OVAL SHAPE OF A CYLINDRICAL WORKPIECE
2 Claims, 3 Drawing Figs.

[52] U.S. Cl. .................................................. 324/40, 324/34 R
[51] Int. Cl. ...................................................... G01r 33/00
[50] Field of Search .......................................... 324/34 R, 34 E, 34 T, 40, 37; 336/130–135

[56] References Cited
UNITED STATES PATENTS

| 2,355,316 | 8/1944 | Mestas | 324/34 D |
| 2,508,494 | 5/1950 | Cook et al. | 324/34 D |
| 3,252,084 | 5/1966 | Krobath | 324/40 |

FOREIGN PATENTS

| 1,236,982 | 6/1960 | France | 324/34 T |

OTHER REFERENCES

McMaster, R.; Nondestructive Testing Handbook; Vol. II; The Ronald Press; New York; 1963; pp. 37.16, 38.25 & 38.26 (copy in 324)

Stocker, W.; Measuring Parts in Motion; Metalworking Production; July 18, 1962; pp. 79– 81 (Copy in 324– 340)

Primary Examiner—Michael J. Lynch
Assistant Examiner—R. J. Corcoran
Attorney—Dan R. Sadler

ABSTRACT: An eddy current system is disclosed herein for inspecting pipes, bars, wire, etc., measuring the diameter and the ovality thereof. The system includes a search unit having a probe which spins around the pipe and generates a signal which is a function of the spacing between the pipe and probe.

Friedrich M.O. Förster,
INVENTOR.
BY.
ATTORNEY.

EDDY CURRENT TEST SYSTEM FOR INDICATING THE OVAL SHAPE OF A CYLINDRICAL WORKPIECE

BACKGROUND OF INVENTION

It is frequently desirable that pipes, bars, wires, etc. have a substantially uniform diameter and a true cylindrical shape. It is possible to check the dimensions of a cylindrical workpiece by manually measuring it at predetermined axially spaced intervals. This is not only a slow and unreliable process but it does not guarantee the accuracy of any dimensions between the points which are measured. More recently it has been proposed to utilize automatic inspection systems for periodically or continuously measuring the dimensions of the workpiece. Although these have been an improvement over the manual methods, they are still not entirely satisfactory.

SUMMARY

The present invention provides means for overcoming the foregoing difficulties. More particularly the present invention provides an inspection system capable of inspecting cylindrical workpieces, such as wires, bars, tubes, etc., for their geometric dimensions. The diameter, variations in the diameter and the oval shape are measured. In the embodiment disclosed herein this is accomplished by providing a search unit having a pair of pickup probes which travel in a true circle around the workpiece and produce a signal corresponding to the spacing between the probes and the test object. By analyzing this signal it is possible to determine to what extent the surface differs from the true circle.

Figure 3:
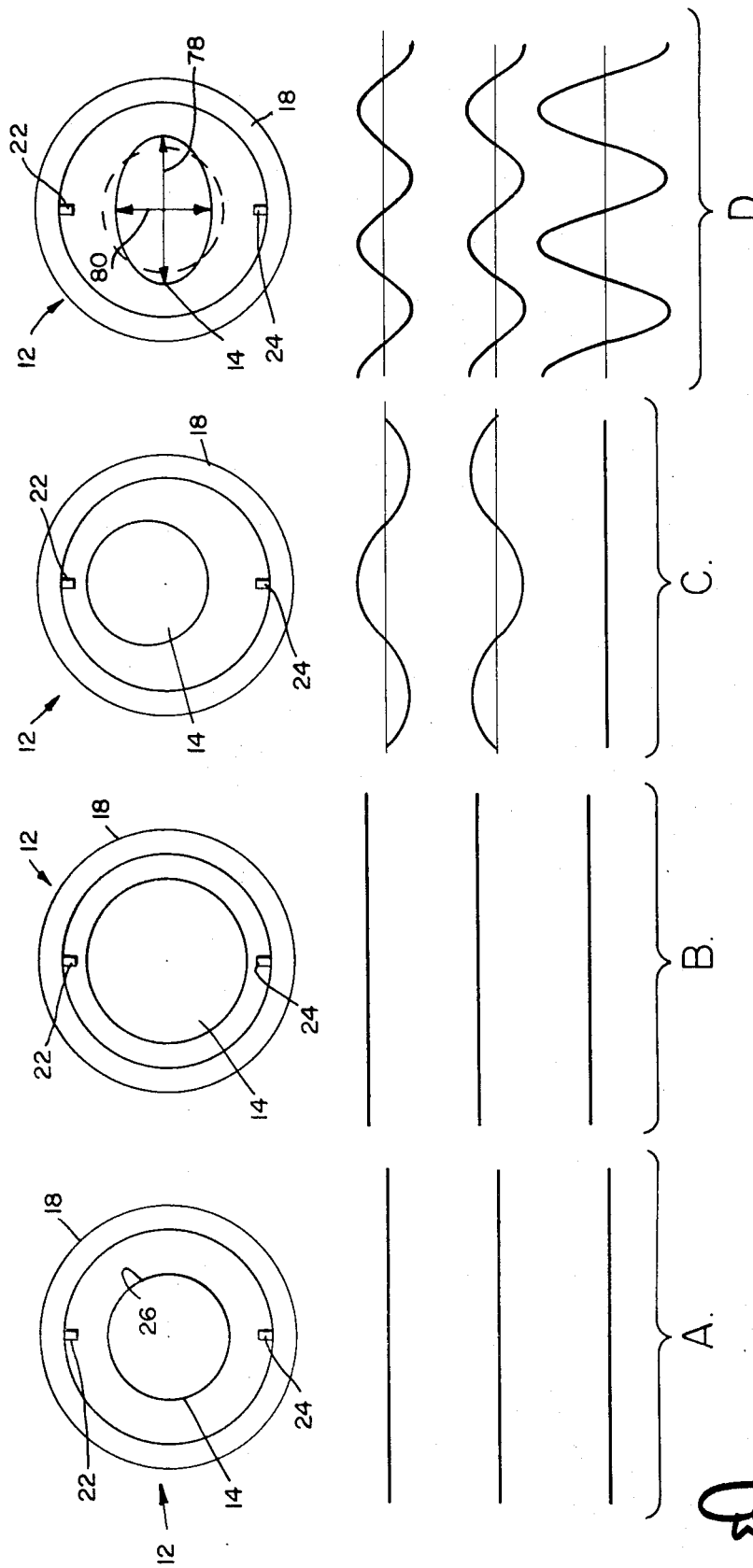
FIG. 3 is a series of cross-sectional views of a search unit used in the system of FIG. 1 and the waveforms representing several different operating characteristics of the system during a correspondingly number of different operating conditions.
Figure 1:
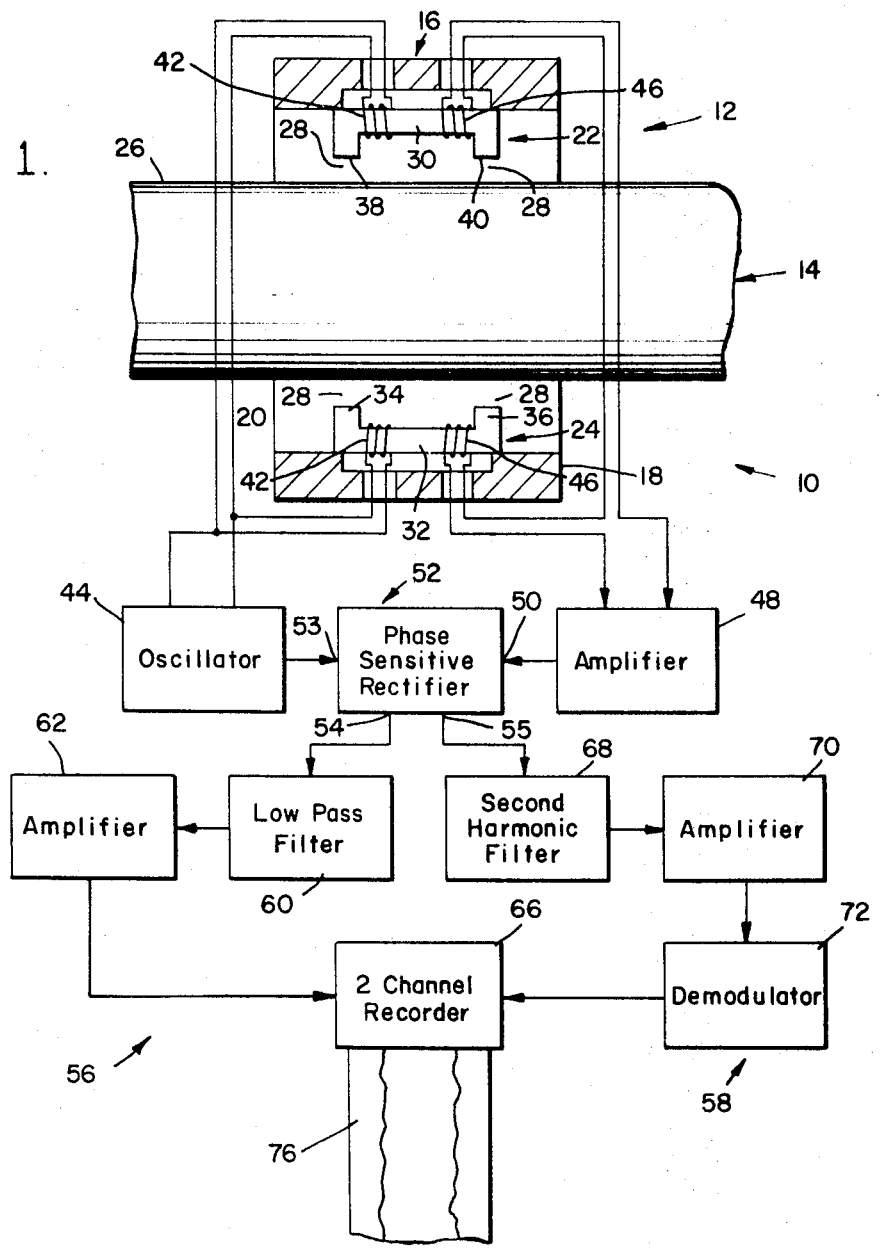
FIG. 1 is a combination cross-sectional view and block diagram of a nondestructive testing system embodying one form of the present invention.

Referring to the drawings in more detail the present invention is particularly adapted to be embodied in a nondestructive testing system 10 for inspecting elongated cylindrical objects, such as bars, wires, etc. The system 10 includes an inspection station 12. The workpieces 14 which are to be tested may be continuously fed through the station by any suitable means. As will become apparent subsequently, the workpiece 14 may travel at a relatively high rate of speed.

The inspection station 12 includes a search unit 16 for scanning the exterior surface of the workpiece 14. In the present instance the search unit 16 includes a rotating or spinning structure such as a hub 18.

This hub 18 is a hollow cylinder having a passage 20 extending axially therethrough. The diameter of this passage 20 is preferably large enough for the largest diameter workpiece 14 to travel freely therethrough. A suitable drive such as a small electric motor (not shown) may be coupled to the hub 18 to rotate it while the workpiece 14 travels axially therethrough.

One or more pickup probes may be mounted on this hub 18 for scanning the exterior surface 26 of the workpiece 14 while the hub 18 is rotating. In the present instance two separate pickup probes 22 and 24 are mounted on the inside of the hub so as to project radially inwardly. They are preferably disposed on diametrically opposed sides of the hub 18.

Although any suitable type of probe may be employed, in the present instance each probe 22 and 24 is of the so-called eddy current type. In a probe of this nature an alternating magnetic field is radiated into the workpiece 14. This creates eddy currents on the surface 26 of the workpiece 14 which reradiates a magnetic field. The probes 22 and 24 include means for sensing these reradiated fields and producing a corresponding electrical signal.

The electrical signals from the probes 22 and 24 are functions of several different factors. For example, the amplitude of the signal is a function of the characteristics of the workpiece 14 and particularly of its surface 26 and also the spacing 28 or distance between the surface 26 and the probe. In the present instance it is preferable for the probes 22 and 24 to be primarily responsive to the spacing 28 and relatively insensitive to the characteristics of the workpiece 14.

Each of the probes 22 and 24 includes a magnetic core 30 of a case ferrite or similar material. The core 30 includes an elongated back 32 and a pair of arms 34 and 36. The arms are disposed at each end of the back 32 at right angles thereto. The outer ends of the arms 34 and 36 form pole faces 38 and 40.

The cores 30 are mounted on opposite sides of the hub 18 so as to be diametrically aligned with each other. The arms 34 and 36 are disposed radially inwardly of the hub and project toward the workpiece 12. The pole faces 38 and 40 are thus juxtaposed to the exterior of the workpiece 12. It may be appreciated there will be a substantial distance or airgap 28 between the faces 38 and 40 and the exterior of the workpiece 12.

A driving or primary winding 42 is provided on each of the cores 30. The windings 42 are preferably wrapped around the back 32 and produce magnetic fields which extend longitudinally of the back 32. The two windings 42 are coupled to a source of alternating currents. This source may be of any desired variety such as an oscillator 44.

When the signal from the oscillator 44 circulates through the windings 42 magnetic fields will be produced which extend from one pole face 38, across the airgap 28 and/or along the surface 26 of the workpiece 14 and returns through the second airgap 28 to the opposite pole face 40. The magnitude of this field is in part a function of the spacing between the pole faces 38 and 40 and the workpiece 14.

When the alternating field is extending into the workpiece 14 it is effective to create eddy currents which circulate on the surface 26 of the workpiece 14 or in the region of the workpiece immediately below the surface 26. The depth to which the currents penetrate is a function of the frequency, i.e., the higher the frequency the less the depth of penetration. In the present instance the dimensions of the airgaps 28 are of primary interest and the nature of the workpiece 14 is of little or no concern. Accordingly, the frequency should be relatively high whereby the eddy currents are confined primarily to the surface 26.

The eddy currents create or reradiate magnetic fields. The reradiated fields extend above the surface 26 of the workpiece 14, across one airgap 28 through a pole face 38 along the back 32 through the other pole face 40 across the airgap 28 and return to the workpiece 14. The magnitude of the reradiated field extending through the core 30 is a function of the dimensions of the airgap 28.

A pickup or secondary winding 46 is provided on each of the two cores 30. Each of the secondary windings 46 is coupled to the fields produced in the core 30 by the primary winding 42 and it is also coupled to the reradiated field created by the eddy currents. Both of these fields have a frequency identical to the frequency of the oscillator 44.

The signal induced in the secondary winding 46 will be displaced in phase from the primary signal by an amount depending on various characteristics of the workpiece. Also this signal will be amplitude-modulated as a function of the size of the airgaps 28.

Figure 2:
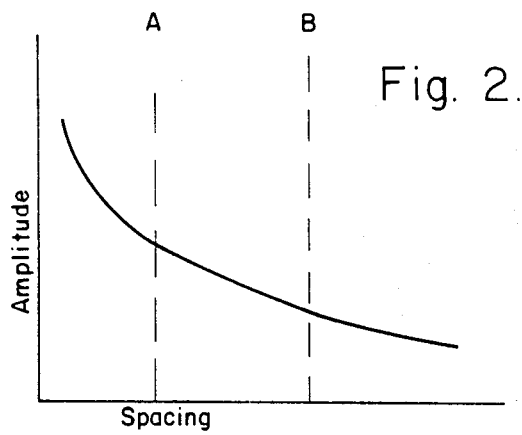
FIG. 2 is a graph representing a certain response characteristic of the system.

FIG. 2 represents the response characteristics of this probe 22 and 24. The vertical axis represents the amplitude of the signal while the horizontal axis represents the spacing 28 between the pole faces 38 and 40 and the surface 26 of the workpiece 14, (i.e., the length of the airgap 38) while inspecting certain types of workpieces. As the length of the airgap 28 increases the amplitude of the signal decreases.

Although this curve is not entirely linear over its entire length there is a segment between the limits A and B wherein the line is substantially straight. The spacing 28 between the probes 22 and 24 and the workpiece 14 should normally be somewhere in this substantially linear range. It should be noted this linear region can be increased by increasing the areas of the pole faces 38 and 40 and increasing the distance between the pole faces, i.e., the length of the back 32.

The two secondary windings 46 are connected in series with each other and to the input of an amplifier 48. Since the windings 46 are connected in series with each other the resultant signal corresponds to the sum of the two individual signals from the two secondaries 46. This amplifier 48 is effective to increase the signal to a more useful level.

The output from the amplifier 48 is connected to the signal input 50 of a suitable demodulator or rectifier. In the present instance a so-called phase sensitive rectifier 52 is employed. The control input 53 is coupled to the oscillator 44 whereby the amplified signal is rectified in a predetermined phase relationship to the original driving signals.

The phase angle at which rectification occurs is normally selected to eliminate or at least reduce the portions of the signal corresponding to variations in the workpiece 14, the direct coupling from the primary winding 42 to the secondary winding 46, etc., and to detect the distance between the pole faces 38 and 40 and the surface 26 of the workpiece 14, i.e., the length of the airgap 28. It will thus be seen the signal on the outputs 54 and 55 of the rectifier 52 will be amplitude modulated to correspond to the variations in the spacings 28 between the probes 22 and 24 and the workpiece 14.

The outputs 54 and 55 of the phase-sensitive rectifier 52 are coupled to the input of a first channel 56 and to the input of a second channel 58. Each of these channels 56 and 58 are effective to extract from the rectified signal certain information regarding the characteristics of the workpiece 14. By way of example, the first channel 56 may be effective to indicate the outside diameter of the workpiece 14 whereas the second channel 58 may be effective to indicate the amount of ovality (i.e., out of round) of the workpiece 14.

The input of the first channel 56 includes a first filter 60 which is preferably of the so-called low-pass variety. In a filter of this variety, the portions of the signal below a cutoff frequency are passed through the filter while those portions of the signal above the cutoff frequency are blocked or suppressed. Normally the cutoff frequency of this filter 60 is below a frequency corresponding to the frequency at which the probes 22 and 24 are spinning around the workpiece 14. The portions of the signal having this or a higher frequency are suppressed.

An amplifier 62 is coupled to the filter 60 to increase the amplitude of the signal to a more useful level. The signal from the filter 60 varies according to the variations in the diameter of the workpiece. Accordingly the amplifier 62 normally is of the DC variety capable of amplifying signals of constant amplitude or of slowly varying amplitude.

The output of the amplifier 62 is in turn coupled to one side of a two-channel recorder 66. This channel is effective to continuously record the diameter of the workpiece 14 on a strip 76 of paper.

The input of the second channel 58 includes a second filter 68. This filter 68 may be of the band pass variety whereby the portions of the signal within the passband pass through the filter 68 while all portions outside of the passband are suppressed. The passband of filter 68 is preferably centered around the second harmonic of the fundamental frequency, i.e., a frequency corresponding to double the speed at which the probes 22 and 24 are spinning around the workpiece 14. The modulations occurring at this frequency will be passed. All other portions of the signal including those of the fundamental frequency are suppressed.

An amplifier 70 is coupled to the output of the filter 68 to increase the amplitude of the second harmonic signal to a more useful level. The output of the amplifier 70 is in turn coupled to a detector or demodulator 72. This is effective to convert the second harmonic signal into a DC or slowly varying signal corresponding to the amplitude modulation.

The demodulator 72 is coupled to suitable means for indicating the ovality or out-of-round of the workpiece 14. In the present instance this is the second channel in the recorder 66.

In order to use the system 10 for inspecting a workpiece 14 for variations in diameter and roundness it is fed axially through the inspection station 12. At the same time the hub 18 is rotated about the workpiece 14 whereby the probes 22 and 24 scan the exterior of the workpiece 14. The combination of the axial travel of the workpiece 14 and the rotation of the probes 22 and 24 results in the entire exterior surface 26 being scanned in a helical pattern. The completeness of this scan is determined by the relative speeds of the probes 22 and 24 and workpiece 14. However, since the diameter and ovality generally vary at a relatively low rate, the degrees of scan may be fairly low, i.e., the hub 18 may rotate at a modest speed even though the workpiece 14 is traveling at a high rate of speed.

Assume the workpiece 14 is perfectly centered in the hub 18 and the exterior surface 26 is a true cylinder as shown in columns A and B of FIG. 3. Under these circumstances the faces 38 and 40 on both probes 22 and 24 will always be uniformly separated from the surface 26. The signals from the two probes 22 and 24 include a carrier wave having a frequency the same as that of the oscillator 44. The amplitudes of the carrier from each probe 22 and 24 is a function of the size of the airgaps 28. Since the airgaps 28 are always the same the amplitude of the carrier is constant.

This signal will be blocked from entering the second channel 58 by the second harmonic filter 68. However, it will pass through the low-pass filter 60, amplifier 62 to the recorder 66 where the amplitude of the signal is recorded. If the outside diameter is small as shown in column A the two signals and their sum will be at a low level. However, if the outside diameter is larger and the airgaps 28 smaller as shown in column B the two signals and their sum will increase to a higher level. It will thus be seen the recorder 66 will record the diameter on the left-channel side of the chart 76.

The foregoing is a somewhat idealized set of circumstances which would seldom, if ever, actually occur. Normally, the workpiece is eccentrically disposed within the hub 18 as shown in Column C. Although the workpiece 14 is a true cylinder with the same diameter as in column A, it is not properly centered in the passage 20. As a result the first probe 22 moves close to the workpiece 14 once during each revolution and remote once during each revolution. This results in the carrier having an average amplitude the same as in column A. However, its amplitude is modulated with a waveform similar to that shown in the first line of column C. This has a frequency corresponding to the speed of rotation of the probe 22.

The second probe moves through a substantially identical path but is disposed diametrically opposite to the first probe 22. The resultant waveform as seen in the second line of column C is displaced 180° from that in the first line. Since the probes are operating in the linear part of the curve of FIG. 2 the amplitudes of the signal will be equal. When these two signals are added together the waveforms will cancel each other but their average values will add together to give a uniform signal the same as if it were perfectly centered.

Next assume the average diameter of the workpiece 14 is the same as in column A. However, as shown in column D it is not a true cylinder but is an oval or ellipse having a major diameter 78 and minor diameter 80.

The average spacing for the probe 22 will be the same as in columns A or C. During each revolution the probe 22 will be twice aligned with the major diameter 78 and twice with the minor diameter 80. As a result the signal from this probe 22 will have two maximums and two minimums during each revolution, i.e., its frequency will be double the speed of rotation.

Since the probes 22 and 24 are diametrically aligned with each other the second probe 24 will be aligned with the major diameter 78 each time the first probe 22 is so aligned. The same also applies to the minor diameter 80. As a result the two waveforms are exactly in phase with each other. These two signals are thus added together to form a second harmonic signal of double their amplitude.

The signal from the amplifier 48 is rectified in the rectifier 52 and coupled to the two channels 56 and 58. The second harmonic signal will be coupled through the filter 68 to the amplifier 70 and demodulator 72 whereby the recorder 66 will record the ovality. The second harmonic is blocked by the filter 60 so that the diameter will still be accurately recorded.

I claim:

1. An inspection system for inspecting the outside of a substantially cylindrical workpiece, said system including the combination of a rotor, a pair of pickup probes mounted on said rotor for traveling around said workpiece in a circle having a diameter greater than the workpiece, said probes being effective to produce signals which are functions of the spacing between the probes and the surface of said workpiece, a filter coupled to the probes and effective to pass only the portion of said signals having a frequency corresponding to the second harmonic of the speed at which said rotor rotates, and an indicator responsive to the portion of said signal passing through said filter and effective to indicate the oval shape of said workpiece.

2. An inspection system for inspecting the outside of a substantially cylindrical workpiece, said system including the combination of a rotor, a pair of pickup probes mounted on said rotor for traveling around said workpiece in a circle having a diameter greater than the workpiece, a core in each of said pickup probes, each of said cores having a pair of faces disposed adjacent the surface of the workpiece whereby said faces travel on said circle, a primary winding on each of said cores for creating eddy currents in the surface of the workpiece, a secondary winding on each of said cores for sensing the magnetic fields radiated by said eddy currents, said faces being separated a sufficient distance from each other to ensure the signals from the probes being a substantially linear function of the spaces between the faces and the surface, a filter coupled to the secondary windings in said probes and effective to pass only the portion of said signals having a frequency corresponding to the second harmonic of the speed at which said rotor rotates, and an indicator responsive to said portion of said signal passing through said filter and effective to indicate the oval shape of said workpiece.

* * * * *